US 8,318,036 B2

(12) United States Patent
Espiard et al.

(10) Patent No.: US 8,318,036 B2
(45) Date of Patent: *Nov. 27, 2012

(54) SIZING COMPOSITION FOR AN INSULATING PRODUCT BASED ON MINERAL WOOL, AND RESULTING PRODUCTS

(75) Inventors: Philippe Espiard, Gouvieux (FR); Isabelle Lesieur, Auvers sur Oise (FR); Bruno Mahieuxe, Neuilly Sous Clermont (FR)

(73) Assignee: Saint-Gobain Isover, Courbevoie (FR)

( * ) Notice: Subject to any disclaimer, the term of this patent is extended or adjusted under 35 U.S.C. 154(b) by 822 days.

This patent is subject to a terminal disclaimer.

(21) Appl. No.: 10/578,571

(22) PCT Filed: Oct. 22, 2004

(86) PCT No.: PCT/FR2004/050530
§ 371 (c)(1),
(2), (4) Date: Dec. 5, 2006

(87) PCT Pub. No.: WO2005/044750
PCT Pub. Date: May 19, 2005

(65) Prior Publication Data
US 2007/0077425 A1    Apr. 5, 2007

(30) Foreign Application Priority Data
Nov. 5, 2003  (FR) .................................... 03 12973

(51) Int. Cl.
*D06M 15/333* (2006.01)
*E04B 1/74* (2006.01)
*B05D 3/02* (2006.01)
*B32B 27/38* (2006.01)

(52) U.S. Cl. ......... 252/8.83; 252/62; 428/375; 428/413; 427/386

(58) Field of Classification Search .................. None
See application file for complete search history.

(56) References Cited

U.S. PATENT DOCUMENTS

| 3,679,465 | A |   | 7/1972  | Flynn ............................ 427/386 |
| 3,679,645 | A |   | 7/1972  | Hort .............................. 526/68 |
| 3,901,833 | A |   | 8/1975  | Flynn ............................ 528/406 |
| 5,908,902 | A | * | 6/1999  | Pfeil et al. ..................... 525/524 |
| 5,968,645 | A | * | 10/1999 | Caccini et al. ................. 428/332 |
| 6,329,473 | B1| * | 12/2001 | Marten et al. ................ 525/438 |
| 7,887,908 | B2| * | 2/2011  | Espiard et al. ............. 428/292.1 |
| 2006/0005580 | A1 |   | 1/2006 | Espiard et al. ................. 65/442 |

FOREIGN PATENT DOCUMENTS

| EP | 0 369 848 |   | 5/1990 |
| FR | 2842189   |   | 1/2004 |
| WO | WO 2004/007395 | * | 1/2004 |

* cited by examiner

*Primary Examiner* — Camie Thompson
(74) *Attorney, Agent, or Firm* — Oblon, Spivak, McClelland, Maier & Neustadt, L.L.P.

(57) ABSTRACT

The invention relates to a sizing composition for a thermal and/or acoustic insulation product, based on mineral wool, comprising an epoxy resin of the glycidyl ether type, an amine hardener and an accelerator chosen from imidazoles, imidazolines and mixtures thereof.

Application to the manufacture of thermal and/or acoustic insulation products having improved mechanical properties after aging, especially in a wet environment.

25 Claims, No Drawings

SIZING COMPOSITION FOR AN INSULATING PRODUCT BASED ON MINERAL WOOL, AND RESULTING PRODUCTS

The present application is the U.S. counterpart of WO05/044750, the text of which is incorporated by reference and claims the priority of the French Application No. 03/12973 filed on Nov. 5, 2003.

The present invention relates to the manufacture of insulation products, especially thermal and/or acoustic insulation products, based on mineral wool. More precisely, it relates to an improved sizing composition based on an epoxy resin allowing the mechanical strength of such products after aging, especially in a wet environment, to be increased.

Insulation products based on mineral wood, especially glass or rock wool, generally take the form of relatively rigid panels, shelves, wound felts or even veils. They are intended in particular for the thermal and/or acoustic insulation of buildings.

The manufacture of such products comprises a first step of manufacturing the wool itself, especially using the technique known as centrifugal attenuation, in which the molten mineral material is converted into filaments, and a forming step in which the filaments are attenuated and entrained towards a receiving member by a high-temperature high-speed gas stream in order to form a sheet thereon. In order to ensure cohesion of the sheet, a sizing composition, which contains a thermosetting resin, is sprayed onto the wool as it travels towards the receiving member. The sheet thus treated is then subjected to a heat treatment in an oven in order to cure the resin and obtain a product having the desired properties, such as dimensional stability, tensile strength, tear resistance, puncture resistance, thickness recovery after compression, and homogeneous colour.

In the insulation product, the binder has the function of binding the fibres together—it must adhere correctly to the glass and spread uniformly over the fibres so as thereafter to be preferably at the junction points between the fibres and thus allow a resilient fibrous sheet to be obtained.

The sizing composition is therefore preferably sprayed when the fibres are still separate fibres, that is to say before formation of the sheet. Consequently, the size is sprayed in the fibre-receiving hopper, beneath the burners that generate the attenuating gas stream. This therefore precludes the use of inflammable organic solvents and/or contaminants for formulating the size, the risk of a fire and/or of contamination in the receiving hopper being too high.

In addition, the resin serving as binder, although it must not cure too rapidly before sheet formation, it must also not have too long a cure time. By controlling this time, the risks of pregelling are thus avoided and the cure time remains compatible with high production rates, especially by taking measures to ensure that the binder has completely cured after the high-temperature oven treatment (around 260° C.).

The most commonly used sizes contain a thermosetting resin of the resol type, obtained by condensation of a phenol with a formaldehyde, or equivalents, in the presence of a basic accelerator, water as dilution agent, urea, serving to reduce the amount of free formaldehyde and also acting as binder, and various additives, such as aqueous ammonia, oil, coupling agents, for coupling to the glass, colorants and, optionally, fillers.

Although this type of size does allow a high level of mechanical performance to be achieved, its use, especially during the oven treatment, generates undesirable gaseous emissions, for example of formaldehyde, ammonia and other volatile organic compounds.

To alleviate this drawback, sizing compositions have been proposed that are based on an epoxy resin of the glycidyl ether type and a non-volatile amine hardener (see EP-A-0 369 848 and FR 02/08873). This solution makes it possible for the emissions to be very substantially reduced, both during manufacture of the insulation product, since complete cure can be achieved at a lower temperature (around 220° C.), and during its use at high temperatures, above 150° C. and up to 700° C.

Although it is important for the mechanical properties of the insulation product to be satisfactory after manufacture and up till its use, in order to ensure that it is properly installed on the site, it is also desirable for them to be maintained for a certain time once the product is in place, in order to guarantee that it has a sufficient lifetime.

For the most part, insulation products have to be subjected, as they age, to thermal cycles of relatively large amplitude and variable condensation conditions that result in them being exposed to moisture, which entails a loss of their mechanical properties. Such losses may be large when the mineral wool is particularly water-sensitive, for example when it is a wool that can dissolve in a physiological medium.

The object of the invention is to remedy these drawbacks and to improve the mechanical strength after aging, especially in a wet environment, of insulation products based on mineral wool provided with an epoxy binder, that is to say to reduce the losses in mechanical properties of these products after aging, especially in a wet environment.

This object is achieved according to the invention by means of a sizing composition based on an epoxy resin of the glycidyl ether type and an amine hardener, this composition being characterized in that it furthermore includes an accelerator chosen from imidazoles, imidazolines and mixtures thereof.

The term "accelerator" here has the usual meaning in the field of chemistry and denotes a compound that increases the rate of reaction between the epoxy resin and the amine hardener.

The size makes it possible for the losses in properties after aging, particularly wet aging, to be markedly reduced compared with a similar product not containing the accelerator, without significantly modifying these properties just after manufacture.

Another subject of the invention is a process for manufacturing an insulation product employing the aforementioned sizing composition.

A further subject of the invention is the insulation products coated with the said sizing composition.

The epoxy resin according to the invention is obtained by the reaction of epichlorohydrin with an alcohol. Preferably, the alcohol is a polyol comprising at least two hydroxyl functional groups per molecule and at most 100, preferably at most 50 and better still at most 10 hydroxyl functional groups per molecule. Particularly preferably, the alcohol is a diol.

Advantageously, the resin has an EEW (Epoxy Equivalent Weight) corresponding to the mass of resin, in grams, containing one gram-equivalent of epoxide functional groups, which is between 150 and 2000, preferably between 160 and 700 and better still at most equal to 300. Such a resin has the advantage of generating a small amount of undesirable emissions during the fibrizing operation and the subsequent oven treatment, and it also remains compatible with the known processes for spraying the size onto the fibres for the purpose of forming insulation products.

Also advantageously, the resin has a functionality (number of epoxide groups per molecule) of at least 2 and preferably less than 10.

The epoxy resin according to the invention is water-dispersible or capable of being emulsified in the presence of an emulsifying agent or a dispersing agent. This is because it is essential for the resin to have at least one of these properties so that the sizing composition can be sprayed properly. In this regard, sprayability is dependent on the water dilutability of the resin, defined as follows: the water dilutability of an epoxy resin emulsion or dispersion is the volume of deionized water that can be added, at a given temperature, to unit volume of this composition before the emulsion or dispersion "breaks", that is to say before the said emulsion or dispersion becomes destabilized or has undergone phase separation. The water dilutability of a resin that can be used in a sprayable sizing composition is advantageously at least 500%, preferably 1000%, at 20° C.

Preferably, the epoxy resin is chosen from resins resulting from the reaction between epichlorohydrin and bisphenol A, bisphenol F, polyethylene glycols, glycerol, pentaerythritol and novolac resins, and mixtures of these resins. The resins formed by a reaction between epichlorohydrin and bisphenol A are particularly preferred.

As examples of such resins, mention may be made of:
resins in aqueous emulsion, sold by Resolution under the names Epi-Rez® 5003-w-55 (EEW=195-215), Epi-Rez® 3510-w-60 (EEW=185-215), Epi-Rez® 3515-w-60 (EEW=225-275), and Epi-Rez® 3522-w-60 (EEW=615-715;
resins that can be emulsified in water, sold by Resolution under the names Epikote® 828 (EEW=184-190), and Epikote® 255 (EEW=193-205) or by Dow Chemical under the names DER 330 (EEW=176-185) and DER 331 (EEW=182-192).

Other epoxy compounds of the glycidyl ether type may be added to the sizing composition. As examples, mention may be made of epoxidized aliphatic compounds and epoxidized fatty alcohols, useful especially for modifying the viscosity of the size, and epoxy resins of the halogenated glycidyl ether type, especially derivatives of dibromophenyl glycidyl ethers, such as dibromophenyl glycidyl ether, 2-methyl-4,6-dibromo-phenyl glycidyl ether, 4-methyl-2,6-dibromophenyl glycidyl ether and 4-cumyl-2,6-dibromophenyl glycidyl ether, which make it possible in particular to give the product better high-temperature resistance. The content of these compounds generally represents less than 30%, preferably less than 10%, by weight of the epoxy resin.

The amine hardener according to the invention is generally chosen from aliphatic polyamines, such as diethylenetriamine (DETA), triethylenetetramine (TETA), tetraethylenepentamine (TEPA) and polyglycoldiamines, cycloaliphatic polyamines, such as 1,3-bis(aminomethyl)cyclohexane, 4,4-diaminocyclohexyl-methane, methylenediamine and 2,4-diaminocyclohexanol, and aromatic polyamines, such as m-phenylenediamine, m-xylylenediamine, diethyltoluenediamine, diaminodiphenylsulphone and dicyandiamine.

The amount of amine hardener to be introduced into the sizing composition depends on the number of amine reactive sites carried by the molecule. Preferably, the hardener has an amine equivalent weight/H ratio defined as the ratio of the amine molecular weight to the number of active hydrogen atoms, which is between 20 and 300. Preferably, the amount of hardener is introduced in stoichiometric amount relative to the resin so as to avoid an excess of hardener which may lead to the emission of volatile products on the fibre-receiving belt and/or in the oven.

Also preferably, the hardener is non-volatile, that is to say that, under the spraying conditions, it cannot undergo spontaneous ignition. The flashpoint of the hardener is advantageously above 150° C. and better still above 180° C.

The sizing composition furthermore includes an accelerator chosen from imidazoles, imidazolines and mixtures thereof. Choosing the accelerator from within a limited family of compounds makes it possible to achieve the desired performance in terms of aging resistance, especially in a wet environment.

As examples of imidazoles, mention may be made of imidazole, 1-methylimidazole, 2-methylimidazole, 2-phenylimidazole, 2-ethyl-4-methylimidazole and 4,4'-methylenebis(2-ethyl-5-methylimidazole).

As an example of an imidazoline, mention may be made of 2-ethyl-N-phenylimidazoline.

Preferably, 2-methylimidazole is used.

Generally, the accelerator is introduced into the sizing composition in an amount of 0.1 to 5 parts, preferably 0.5 to 3 parts and better still 0.5 to 2 parts, by weight of dry matter per 100 parts by weight of dry matter of epoxy resin/hardener.

The sizing composition may furthermore include the following additives, per 100 parts by weight of dry matter of resin/hardener:
0 to 2 parts, preferably around 0.5 parts, of a coupling agent such as a silane;
0 to 20 parts, preferably 6 to 15 parts, of an oil.

The well-known role of the aforementioned additives will be briefly recalled here:
the water has a lubricating role and makes it possible to adjust the viscosity to the spraying conditions, to cool the fibres and limit pregelling effects;
the coupling agent ensures bonding between the mineral fibre and the cured binder. It helps to increase the mechanical properties and contributes to improving the aging resistance. The silane is generally an amino silane, preferably γ-aminopropyltriethoxysilane; and
the oil lubricates the fibres, helps to reduce dust liable to be generated when handling the finished products (for example insulating sheets) and improves the feel. It is generally inert with respect to the other constituents and can be emulsified in water. Usually, it is an oil consisting of hydrocarbons extracted from petroleum.

The subject of the invention is also a process for manufacturing a thermal and/or acoustic insulation product, based on mineral wool provided with an epoxy binder, exhibiting better mechanical resistance after aging, especially in a wet environment, in which process:
a) mineral fibres are formed from a molten mineral composition;
b) a sizing composition, comprising an epoxy resin of the glycidyl ether type, an amine hardener and an accelerator chosen from imidazoles, imidazolines and mixtures thereof, is sprayed onto the fibres obtained at a);
c) the fibres are collected in the form of a sheet; and
d) the sheet is subjected to a heat treatment at a temperature below about 260° C., preferably around 220 to 240° C.

In general, it is necessary for the sizing composition to have a pot life compatible with the spraying conditions and for it not to cure before sheet formation. This means, in other words, that there must be as little pregelling of the size as possible.

Given that the rate of reaction between the amine functional groups of the hardener and the epoxide functional groups increases very rapidly in the presence of the accelerator, preparation of the size by mixing, even extemporaneously, the epoxy resin, the amine hardener, the accelerator and optionally, the additives prior to spraying is to be avoided in order to prevent any risk of the spray ring becoming blocked.

It is preferred to spray the size onto the fibres according to the following two methods of implementation.

In a first method of implementation, the accelerator is mixed with the other constituents of the size, preferably upstream of the spray ring and as late as possible, and then the size is applied in the usual manner to the mineral wool. This method of implementation is advantageous when the rate of reaction between the epoxy resin and the amine hardener is low enough and does not cause premature gelling that may lead to total or partial blockage of the spray means.

According to a first variant, the accelerator is introduced into the mixture of the other constituents of the size, which constituents may be introduced separately or may have been mixed beforehand (forming a premix). It is preferred to introduce the accelerator into a premix containing all of the other constitutes of the size.

According to a second variant, a first mixture, consisting of the accelerator and the amine hardener, is produced and a second mixture, consisting of the epoxy resin and the other constituents of the size, is produced, and then the said first and second mixtures are introduced before the spray ring.

In a second preferred method of implementation, valid even when the reactivity of the size is low, the accelerator is applied separately from the spraying of the other constituents of the size onto the fibres. For example, the accelerator in aqueous phase can be sprayed near the ring for spraying the other constituents of the size, especially by superposing two spray rings in the path of the mineral wool in the direction of the receiving member, one ring (preferably the first in the direction of advance of the wool) spraying the accelerator and the second one spraying the other constituents of the size.

The insulation products obtained according to one or other of the methods of implementation, which also constitute a subject of the invention, contain 0.5 to 15%, preferably 1 to 12%, by weight of cured binder relative to the total weight of mineral fibres. In its crosslinked form, the binder is solid, infusible and insoluble in water.

The products obtained are white in colour, if no colorant has been added.

The insulation products obtained may have the appearance of a sheet or a veil. They may be in the form of a panel of variable stiffness, a shell, or a roll (of felt or veil). Where appropriate, at least one of their faces is coated with a layer or film for protecting the mineral wool, for example a veil of mineral fibres, preferably glass fibres, or a sheet of kraft paper. Particularly preferably, the veil of fibres has a weight of between 10 and 300 g/m$^2$ and contains at least 1%, preferably at least 2% and advantageously at least 4%, by weight of cured binder obtained from the size according to the invention.

The products obtained within the context of the present invention are especially intended to form thermal and/or acoustic insulation products, in particular for buildings and for applications requiring high resistance to high temperatures (industrial shells and domestic ovens. They may also serve as substrates for soilless cultivation.

The following non-limiting examples illustrate the invention.

EXAMPLE

Glass wool was manufactured using the internal centrifugal technique in which the molten glass composition was converted into fibres by means of a tool called a spinner, comprising a basket forming a chamber for receiving the molten composition and a peripheral band pierced by a multitude of holes. The spinner was rotated about its axis of symmetry, placed vertically, the composition was ejected through the holes under the effect of the centrifugal force, and the material escaping from the holes was attenuated into fibres with the assistance of an attenuation gas stream.

In the conventional manner, a size spray ring was placed beneath the fibrizing spinner so as to spread the sizing composition uniformly over the glass wool as it was being formed.

The mineral wool thus sized was collected on a belt conveyor equipped with internal suction boxes that held the mineral wool, in the form of a felt or sheet, on the surface of the conveyor. The conveyor then ran through an oven maintained at 220° C. in which the resin of the size was cured to form a binder.

The composition of the size was the following (in parts by weight of dry matter):

| | |
|---|---|
| epoxy resin of the glycidyl ether type: Epi-Rez ® 3510-w-60 (from Resolution): | 85 parts |
| hardener: tetraethylenepentamine (TEPA) | 15 parts |
| accelerator: 2-methylimidazole | 1 part |
| coupling agent: Silquest ® A1100 (from Crompton) | 0.5 parts |
| oil: Mulrex ® 88 (from Mobil) | 9.5 parts |

The size composition was sprayed under the following conditions: a first mixture, comprising the resin, the coupling agent and the oil, and a second mixture, comprising the hardener and the accelerator, were produced. These two mixtures were fed separately into the spray ring and combined just before their introduction into the said ring. The spray rate was set so as to deposit around 5% by weight of dry matter relative to the weight of glass wool.

Two control tests were carried out with a size not containing the accelerator, the first being treated in an oven at 220° C. (Control 1) and the second at a temperature of 260° C. (Control 2).

Another control test was also carried out with a size containing 2,4,6-tri(dimethylaminomethyl)phenol as accelerator (Control 3).

The tensile strength after manufacture ($TS_{man}$) and the tensile strength after accelerated aging in an autoclave at a temperature of 105° C. and 100% relative humidity for 15 minutes ($TS_{15}$) or 45 minutes ($TS_{45}$) were measured on the product obtained.

The tensile strength TS was measured according to the ASTM C 686-71T standard on a specimen cut from the insulation product by stamping. The specimen had the shape of a torus 122 mm in length, 46 mm in width, a radius of curvature of the cut at the outer edge equal to 38 mm and a radius of curvature of the cut at the inner edge equal to 12.5 mm.

The specimen was placed between two cylindrical mandrels of a test machine, one of which was fixed and the other moved at a constant speed. The breaking force F (in grams force) of the specimen was measured and the tensile strength TS defined by the ratio of the breaking force F to the mass of the specimen was calculated.

The results are given in Table 1, which indicates, for each test, the percentage loss of tensile strength relative to the initial state after manufacture and the percentage improvement over the control containing no accelerator (the value in brackets).

The thickness recovery was measured on the product obtained, allowing the dimensional behaviour to be assessed. The procedure was as follows: the product was compressed with a degree of compression (defined as the ratio of the nominal thickness to the thickness under compression) of 6/1 for 1, 12 and 30 days. The thickness recovery corresponds to the ratio of the thickness after compression to the nominal thickness (expressed in percent). The results are given in Table 1.

TABLE 1

|  | $TS_{man}$ | $TS_{15}$ (gForce/g) | Loss (%) | $TS_{45}$ (gForce/g) | Loss (%) | Thickness recovery (%) 1 d | 12 d | 30 d |
|---|---|---|---|---|---|---|---|---|
| Example | 302 (−4.4%) | 204 (+25.9%) | 32.5 | 167 (+51.8%) | 44.7 | 140 | 138 | 137 |
| Control 1 | 316 | 162 | 48.7 | 110 | 65.2 | 137 | 136 | 136 |
| Control 2 | 300 | 159 | 47.0 | 120 | 60.0 | 140 | 137 | 136 |
| Control 3 | 301] | 147 | 51.1 | 110] | 63.5 | 141 | 139 | 138 |
| Control 4 | 327 | 253 | 22.2 | 208 | 36.0 | 143 | 137 | 137 |

The results in Table 1 show that the product according to the invention (Example) has a better tensile strength than the equivalent product containing no accelerator (Control 1) and the percentage loss after aging is less, whether after 15 minutes or 45 minutes of autoclave treatment.

Compared with the product containing no accelerator, the improvement in tensile strength of the highly aged products is equal to 51.8%, which represents a very substantial improvement.

It should be noted that the presence of the catalyst does not degrade the properties of the products according to the invention, whether as regards tensile strength after manufacture ($TS_{man}$) or thickness recovery.

An improvement in tensile strength is not obtained with the conventional accelerator of Control 3. Nor does the higher curing temperature (of Control 2) make it possible to achieve a better tensile strength after aging. For comparison, Table 1 indicates the tensile strength and thickness recovery values of a standard product (Control 4) treated with a size incorporating a conventional phenol-formaldehyde resin in an oven at 260° C.

The size had the following composition (in parts by weight):

| | |
|---|---|
| phenol-formaldehyde resin | 55 parts |
| urea | 45 parts |
| coupling agent (Silquest ® A 1100) | 0.5 parts |
| oil (Mulrex ® 88) | 9 parts |
| ammonium sulphate | 3 parts |
| aqueous ammonia (20% solution) | 6 parts |

The phenolic resin was of the type described in EP-A-0 148 050.

The product according to the invention does not have the level of performance of that containing a phenolic resin; nevertheless, it does constitute a good compromise as it reconciles good aging resistance, especially in a wet environment, with a very low level of emissions of undesirable gases (which is not the case with phenolic resins, which release formaldehyde) and a lower energy cost, thanks to the use of ovens operating at lower temperature.

The invention claimed is:

1. An aqueous sizing composition for insulation products based on mineral wool, comprising a water-dispersible or water-emulsifiable epoxy resin of a glycidyl ether, wherein the epoxy resin is prepared by the reaction of epichlorohydrin with an alcohol, an amine hardener, a silane coupling agent, and an accelerator selected from the group consisting of imidazoles, imidazolines and mixtures thereof.

2. The composition according to claim 1, wherein the accelerator is selected from the group consisting of imidazole, 1-methylimidazole, 2-methylimidazole, 2-phenylimidazole, 2-ethyl-4-methyl-imidazole, 4,4'-methylenebis(2-ethyl-5-methylimidazole) and 2-ethyl-N-phenylimidazoline.

3. The composition according to claim 1, wherein the resin has an Epoxy Equivalent Weight of between 150 and 2000.

4. The composition of claim 3 wherein the Epoxy Equivalent Weight has maximum value of 300.

5. The composition according to claim 1, wherein the epoxy resin has a water dilutability, at 20° C., of at least 500%.

6. The composition according to claim 1, wherein the hardener is selected from the group consisting of aliphatic polyamines, polyglycoldiamines, cycloaliphatic polyamines, and aromatic polyamines.

7. The composition according to claim 1, wherein the accelerator is present in an amount of 0.1 to 5 parts by weight of dry matter per 100 parts by weight of dry matter of epoxy resin/hardener.

8. The composition according to claim 1, wherein the hardener has an amine equivalent weight/H ratio of 20 to 300.

9. The composition according to claim 1, which includes the following additives, per 100 parts by weight of dry matter of resin/hardener: up to 2 parts, of a coupling agent; and/or up to 20 parts, of an oil.

10. A process for manufacturing a thermal and/or acoustic insulation product, based on mineral wool, comprising: a) forming mineral fibres from a molten mineral composition; b) spraying a sizing composition according to claim 1 onto the fibres obtained at a); c) collecting the fibres in the form of a sheet; and d) subjecting the sheet to a heat treatment at a temperature below about 260° C.

11. The process according to claim 10, wherein an accelerator is mixed with the other constituents of the size before being spraying onto the fibres.

12. The process according to claim 10, wherein an accelerator is applied separately from the spraying of the other constituents of the size onto the fibres.

13. A thermal and/or acoustic insulation product based on mineral wool, prepared with a sizing composition according to claim 1.

14. The insulation product according to claim 13, comprising from 0.5 to 15% cured binder.

15. The insulation product according to claim 13, which includes a veil of mineral fibres, having a weight of between 10 and 300 g/m², placed on at least one of the external faces of the said product, wherein said veil comprises at least 1% by weight of cured binder obtained from the sizing composition.

16. The method of claim 15, wherein the wool is glass wool or rock wool.

17. A method for improving the mechanical strength after aging of an insulation product based on mineral wool comprising applying the sizing composition according to claim 1 to the insulation product.

18. The composition according to claim 1, wherein the hardener is selected from the group consisting of diethylenetriamine, triethylenetetramine, tetraethylenepentamine, 1,3bis(aminomethyl)cyclohexane, 4,4-diaminocyclohexylmethane, methylenediamine, 2,4-diaminocyclohexanol, m-phenylenediamine, m-xylylenediamine, diethyltoluenediamine, diaminodiphenylsulphone, dicyandiamine, and mixtures thereof.

19. The composition according to claim 1, wherein the composition is sprayable.

20. The composition according to claim 1, wherein the alcohol is a polyol.

21. The composition according to claim 1, wherein the alcohol is a diol.

22. The composition according to claim 1, further comprising:
a petroleum oil.

23. The composition according to claim 1, wherein the accelerator is 2-methylimidazole.

24. The composition according to claim 1, comprising:
a bisphenol epoxy resin of the glycidyl ether type and 2-methylimidazole.

25. The composition according to claim 1, wherein the accelerator is 2-methylimidazole and is present in an amount of 0.1-1 parts by weight per 100 parts by weight of dry matter; the silane coupling agent is present in an amount of 0.5-2 parts by weight per 100 parts by weight of dry matter; and the composition further comprises a petroleum oil.

* * * * *